May 8, 1923.                                                                 1,454,746
C. M. JONES
AUTOMOBILE TITLE IDENTIFYING, THEFT DISCOURAGING AND DETECTING MEANS
Filed Jan. 25, 1923

Fig. 1.

Serial No. A12057   No. 12449
Commonwealth of Kentucky
County of Jefferson
Signature of
*John Doe*
Original Owner
Occupation  Lawyer
City  Louisville  State Kentucky
Street and No. 1211 S. Fourth St.
Physical Description of Owner
Age 35  Height 6ft. 3in  Weight 185 lbs
Color of eyes  blue   Hair brown
Complexion  ruddy   Sex male
Make of Auto-Truck Blank   H.P. 35
Model 1922   Engine No. 134567
Serial No. 29785   Chassis No. 13785
Purchased from  Blank Motor Co.
City Louisville  State Kentucky
Date  August 19, 1922
Transferred by  *John Doe*
Original Owner
*John Brown*
Signature of Clerk   Official Seal
Transferee  *John Smith*
Second Owner
Occupation  Salesman
Street and No. 1326 S. Third St.
City  New Albany
County Floyd  State Indiana
Date  January 15, 1923
Physical Description of Transferee
Age 29  Height 6ft. 4in  Weight 178 lbs.
Color of eyes  brown   Hair brown
Complexion  ruddy  Sex male
*John Brown*
Signature of Clerk  Official Seal

Fig. 2.

Transferred by _____ Second Owner
Signature of Clerk   County Seal
Transferee _____ Third Owner
Occupation _____
Street and No. _____
City _____
County _____ State _____
Date _____
Physical Description of Transferee
Age _____ Height _____ Weight _____
Color of eyes _____ Hair _____
Complexion _____ Sex _____
Signature of Owner
Signature of Clerk   Official Seal
Signature of Chauffeur
Physical Description of Chauffeur
Age _____ Height _____ Weight _____
Color of eyes _____ Hair _____
Complexion _____

Fig. 3.

Description of Car or Truck Blank touring H.P.35
Model 1922   Engine No. 134567
Serial No. 29785   Chassis No. 13785
Purchased from  Blank Motor Company
City  Louisville
County Jefferson  State Kentucky
Street and No. 504 E. Jefferson St.
Physical Description of Owner
Occupation  Lawyer
Age 35 Height 6ft. 3in. Weight 185 lbs.
Color of eyes  blue   Hair brown
Complexion ruddy   Sex male
*John Doe*  *John Brown*
Signature of Owner   Official Seal   Signature of Clerk

WITNESS:

*Charles M. Jones*
INVENTOR
BY *Victor J. Evans*
ATTORNEY

Patented May 8, 1923.

1,454,746

UNITED STATES PATENT OFFICE.

CHARLES M. JONES, OF LOUISVILLE, KENTUCKY, ASSIGNOR TO JONES NATIONAL AUTOMOBILE REGISTRATION SYSTEM, INC., OF LOUISVILLE, KENTUCKY, A CORPORATION OF KENTUCKY.

AUTOMOBILE TITLE-IDENTIFYING, THEFT DISCOURAGING AND DETECTING MEANS.

Application filed January 25, 1923. Serial No. 614,869.

*To all whom it may concern:*

Be it known that I, CHARLES M. JONES, a citizen of the United States, residing at Louisville, in the county of Jefferson and State of Kentucky, have invented new and useful Improvements in Automobile Title-Identifying, Theft Discouraging and Detecting Means, of which the following is a specification.

The object of my said invention is the provision of simple, practical and highly efficient and useful means for establishing identity between automobile and owner, discouraging the theft and illegitimate sale of automobiles and promoting the detecting of theft of automobiles.

To the attainment of the foregoing, the invention consists in the improvement as hereinafter described and definitely claimed.

In the accompanying drawings, forming part of this specification:—

Figure 1 is a perspective comprising three of the record units or slips comprised in my improved means, it being understood that at least two of the said units are employed in the carrying out of my invention, and that the two, three or more units bear data identical with the data illustrated on the uppermost unit.

Figure 2 is a view of the back of one of the said units, the said backs being identical.

Figure 3 is a face view of what I designate the key unit or card comprised in my novel means.

Similar numerals of reference designate corresponding parts in all of the views of the drawings.

The record units or slips of my novel means are designated by 1, and the key unit or card is designated by 2.

It is of the essence of my invention to employ at least two of the record units or slips 1, all bearing identical data, though three or more of the said record units or slips may be employed without affecting my invention.

Each of the record units or slips 1 has printed or otherwise produced on its face the inscriptions shown in Figure 1 and including the "Serial No." 3 the "No." 4, the venue 5 of the recording officer, the line 6 for the signature of the original owner, the appropriately prefixed line 7 for the occupation of said owner, the appropriately prefixed lines 8 for the city and State of the owner's address, the appropriately prefixed line 9 for his street address, the appropriately headed collection of appropriately prefixed lines 10, for the physical description of the said owner, the appropriately prefixed collection of lines 11 for the data identifying the particular automobile involved, the appropriately prefixed lines 12 for data indicating the origin of the automobile, the appropriately prefixed line 13 for the date when ownership was acquired by the original owner, the appropriately prefixed line 14 to receive the signature of the original owner when the automobile is to be transferred by said original owner to another party, an appropriately prefixed line 15 for the signature of the recording official attesting said transfer, an appropriately prefixed line 16 for the reception of the signature of the transferee or second owner, an appropriately prefixed collection of lines 17 for the reception of data setting forth the occupation and address of said transferee or second owner, an appropriately prefixed line 18 for the entry of the date of the said change of ownership, an appropriately headed and prefixed collection of lines 19 for the entry of data having to do with the physical appearance of the transferee, and a line 20 bearing an appropriate suffix 21 and designed to receive the signature of the recording official, and this at the time when the record unit or slip is filled in down to ing including the data on the data line 13. It is to be distinctly understood that the data just described in detail is the preferred data and that it is within the purview of my invention broadly considered to provide each of the record units or slips 1 on its face with data of analogous purport, and this without involving departure from the scope of my claimed invention. By reference to Figure 2 it will also be understood that in the preferred embodiment of my invention each of the record units or slips 1 is provided on its back with an appropriately prefixed line 30 to receive the signature of a second owner, a line 31 above an appropriate suffix and designed to receive the signature of the recording officer, an appropriately prefixed line 32 to receive the signature of a third owner, a collection of appropriately prefixed lines 33 for the entry of data concerning the address of the said third owner, an appropriately prefixed line 34 to receive the date of the transfer to the third owner, a collection of appropriately prefixed and headed lines 35 for the reception of data having to do with the physical appearance and characteristics of the third owner, an appropriately suffixed line 36 for the signature of the third owner, an appropriately suffixed line 37 for the signature of the county clerk or other recording officer, an appropriately suffixed line 38 for the signature of a driver or chauffeur when one is employed in association with the particular car and an appropriately headed and prefixed collection of lines 39 for the reception of data covering the physical appearance and characteristics of the chauffeur.

The key card 2 in accordance with the preferred embodiment of my invention is provided with a collection of appropriately prefixed lines 40 for the reception of data identifying the particular automobile involved, a collection of appropriately prefixed lines 41 for the reception of data indicating the source of origin of the said automobile, a collection of appropriately headed and prefixed lines 42 for the reception of data covering the occupation and the physical characteristics of the owner who derives title from said source of origin, an appropriately suffixed line 43 for the reception of the signature of the said owner deriving title as stated, and an oppropriately suffixed line 44 for the reception of the signature of the recording officer.

In the practical use of my novel means the lines 3 and 4 of the record units or slips 1 are provided with numbers in series—i. e., the sets of record units of slips 1 will be numbered in regular sequence, this with a view to lessening the liability of counterfeiting, and the sequence of the said numbers will be entirely under the control of the county clerk of the jurisdiction indicated or any other proper recording officer.

Also in the practical use of my novel means it is incumbent on the purchaser of an automobile to present himself and his bill of sale from the Blank Motor Company of Louisville, Kentucky, for instance, before the county clerk of the county of Jefferson, State of Kentucky, for instance, or other proper officer. It is then incumbent on the county clerk, hereinafter designated the recording official to provide at least two of the record units or slips 1 with a serial number on the line 3 and a number on the line 4, and it is also incumbent on the said recording official after satisfying himself of the identity of the said party appearing before him to have the said party or original owner sign at least two of the numbered record units or slips 1 on the line 6. The recording official then examines the party presenting himself and fills in on the lines 7 to 10 of at least two of the record units 1, the data covering the occupation, address and the physical characteristics of the party. The recording official then fills in on at least two of the record units 1, the lines 11 to 12, procuring the data for the said lines as well as the data for the date line 13 from the mentioned bill of sale presented. At this time the lines 14 on at least two of the units 1 are left blank as are also the lines 15 to 19, inclusive. It is to be understood, however, that at the same time the recording official signs both of the units 1 on the line 20 and impresses his seal $21^x$ on the units 1 over a portion at least of his said signature. Incident to the said original transaction the recording official fills in on the key unit or card 2 the descriptive data of the automobile and the data indicating the origin of the automobile, taking said data from the said bill of sale, and the recording official also fills in on the key unit or card 2 the data covering the physical description of the party representing himself as owner, and with this done the recording official has the owner sign on the line 43, and signs himself on the line 44 after which he impresses his seal 47 on the key unit or card so as to cover portions of his signature and the signature of the owner.

After the transaction indicated between the original owner and the recording official, it is the province of the recording official to retain one of the filled in or partially filled in record units 1, and to preserve the same in his archives, the other partially filled in record unit 1 and the filled in key card or unit 2 being handed to the original owner to be carried in his pocketbook or otherwise on his person. The original owner also in the practice of my invention arranges to carry the partially filled in record unit 1 at some place in or on the automobile involved, and preferably in or on such a part of the automobile that the said record unit or slip is readily accessible or is visible to any party in authority who has occasion to examine the record unit with a view to establishing identity between the party in possession of the automobile and the party described in the record unit or slip 1. In this connection it will be noted that even if the bona fide owner has lost the key unit or card 2 or has left the same at home, a person in authority can readily satisfy himself of the identity of the party in possession of the automobile by comparing said party with the physical characteristics set forth on the card and by having the party in possession of the automobile write his signature so that the said signature can be compared with the signature on the line 6 of the record unit. If the original owner who signs as stated on the line 6 of at least two of the record units 1 employs a chauffeur, the chauffeur should sign on the line 38 and his physical description should be entered in the lines 39 on the backs of at least two of the units 1, one of the said units 1 to be preserved in the office of the recording official and the other unit or units to be carried in or on the automobile involved. Because of this if the automobile is in the possession of the chauffeur, and a person in authority questions the chauffeur's right of possession, the matter can be readily determined to the satisfaction of the person in authority by comparing the inscribed physical characteristics on the unit or units 1 on the car with the alleged chauffeur and having the chauffeur write his signature, if deemed necessary, which may be compared with the chauffeur's signature on the unit or units 1.

When the original owner John Doe has arranged to sell the identified automobile to John Smith, for instance, the original owner, John Doe, for instance and John Smith, appear before the recording official to have John Doe sign at least two of the partially filled in units 1 on the line 14 and to have the transferee John Smith sign at least two of the units 1 on the line 16. It is also the province of the recording official to fill in the occupation, address and physical description of the transferee John Smith on the lines 17 to 19, on at least two of the partially filled in units 1, whereupon the recording official signs at least two of the recording units on the line 15 and places thereon his seal 50 so that the said seal covers portions at least of the signatures of John Doe, John Brown, and John Smith, this with a view to precluding the possibility of the signatures being changed. The recording official then retains the unit 1 originally retained by him and delivers the other unit 1 to the second owner John Smith to be placed by John Smith on or in the automobile involved as aforesaid. The recording official also takes up the key unit or card 2 originally delivered to John Doe and attaches the same to and preserves it with the mentioned recording unit 1 in his archives. Then to complete the second transaction the recording official delivers to the second owner John Smith a key card 2 similar to the key card 2 of Figure 3 excepting that the second key unit or card 2 will bear a description of occupation, and physical characteristics of the second owner John Smith and will also bear the signature of the said John Smith on the line 43 and the signature of the recording official on the line 44, and portions of the said signatures will be covered by the impressed seal 47 of the recording official which will be placed by the official on the second key unit or card 2 precedent to the delivery of the same to the second owner John Smith to be carried on his person in the same manner as the first key unit or card 2 was to be carried by the original John Doe when John Doe was the owner of the automobile.

When John Smith the second owner arranges to sell the automobile involved to another person the procedure described incident to the transfer of the automobile from John Doe to John Smith is repeated, it being incumbent on the second owner John Smith to appear with the record units 1 and his key card 2 and also with the prospective transferee or third owner before the recording official. Then on at least two of the record units 1, including the one preserved by the recording official as before described, the second owner John Smith signs on the line 30, the recording official signs on the line 31, and the third owner signs on the line 32. Then in the lines 33 the recording official enters the occupation and address of the third owner, and on the line 34 he enters the date of sale to the third owner and on the lines 35 he enters the description of the physical characteristics of the third owner after which he impresses on the units 1 his official seal so as to cover portions of the signatures of the second owner, the recording official and the third owner. The recording official then retains the unit 1 originally retained by him, and delivers the other unit or units 1 to the third owner, and takes up the key unit or card 2 previously delivered to the second owner, and furnishes to the third owner a similar key card except that the third key card will bear the occupation, and physical characteristics of the third owner together with the signature of the third owner on the line 43 and the signature of the recording official on the line 44 and a seal 47 so affixed or impressed as to cover portions of the said signatures. Manifestly when equipped as stated the third owner is in a position to establish at any time the validity of his claim to ownership of the automobile involved to any party sufficiently interested to inquire into the ownership of the said automobile.

The data hereinbefore described to be placed on the backs of at least two of the units 1 when a chauffeur is employed by the original owner is of course to be used to actual advantage when a chauffeur is employed by either the second owner or the third owner, and when different chauffeurs are employed by the first, second or third owners, the data pertaining to the chauffeur will be made to accord on at least two of the units 1 incident to each transaction or transfer from the first owner to the second owner and transfer from the second owner to the third owner, the seal designated by 60 in Figure 2 being only employed when a chauffeur is employed and is generally in direct possession of the automobile involved.

The great utility of my novel means will be fully appreciated when it is stated that the said means is calculated to discourage the theft of automobiles and to assist lawful authority in detecting thefts and in also determining the right of a party in direct possession of an automobile to have lawful possession of the automobile. It will also be appreciated that when my invention is practiced or carried out by the described use of my novel means the market for stolen automobiles will be practically eliminated, this because with my novel means in wide spread use the most careless and imprudent person will not purchase an automobile without strictly following the procedure set forth in the foregoing description of my invention.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modification may be made such as fall within the scope of my invention as defined in my appended claims.

Having described my invention, what I claim and desire to secure by Letters-Patent, is:—

1. As an article of manufacture, an automobile and automobile possessor identifying and detecting unit bearing legended spaces for data identifying a particular automobile, legended spaces for data covering the physical characteristics of the first owner in rightful possession of the particular automobile, legended spaces for data covering the physical characteristics of an assignee of the particular automobile in rightful possession thereof on title derived from the first owner, and legended spaces for the signatures of the first owner, an assignee who is to derive title from said first owner, and a recording officer; the legended spaces for data covering the physical characteristics of the first owner preceding the legended spaces for data covering the physical characteristics of the assignee, and the two sets of said legended spaces for physical characteristics being arranged at opposite sides of legended spaces for the reception of the signatures of the original owner, the assignee and recording officer, and the legended spaces for data covering the physical characteristics of the first owner being preceded by a legended line for the signature of said individual, and the legended spaces for data covering the physical characteristics of an assignee who is to derive title from the original owner being followed by a legended space for the signature of a recording officer, and the first-named legended spaces for the signature of the original owner, the signature of a recording officer and the signature of an assignee being grouped in close proximity whereby a single impressed seal will cover portions of all three signatures.

2. Automobile and automobile-possessor identifying and detecting means comprising three units, one to be preserved by a recording official and the other two to be possessed by the party in rightful possession of a particular automobile; two of the said units respectively, bearing legended spaces for data identifying a particular automobile, legended spaces for data covering the physical characteristics of the first owner in rightful possession of the particular automobile, legended spaces for data covering the physical characteristics of an assignee of the particular automobile in rightful possession thereof on title derived from the first owner, and legended spaces for the signatures of the first owner, an assignee who is to derive title from said first owner, and a recording officer, said legended signature spaces being grouped in close proximity whereby a single impressed seal will cover portions of all three signatures, and the third unit bearing legended spaces for the physical description and signature of the last owner of the particular automobile, and a legended space for the signature of a recording official, said signature spaces in close proximity whereby after placing of the signatures a single impressed seal serves to cover portions of both of the signatures.

In testimony whereof I affix my signature.

CHARLES M. JONES.